United States Patent
Avrahami et al.

(10) Patent No.: US 10,530,787 B2
(45) Date of Patent: Jan. 7, 2020

(54) DETECTING MALWARE ATTACKS USING EXTRACTED BEHAVIORAL FEATURES

(71) Applicant: INTERNATIONAL BUSINESS MACHINES CORPORATION, Armonk, NY (US)

(72) Inventors: Shlomit Avrahami, Jerusalem (IL); Tali Finelt, Jerusalem (IL); Itai Gordon, Modiin (IL); Yakir Keisar, Toronto (CA); Ilan Prager, Beit Shemesh (IL); Alexander Pyasik, Maaleh-Adumim (IL); Oded Sofer, Midreshet Ben Gurion (IL); Or Bar-Yaacov, Jerusalem (IL); Yifat Yulevich, Kfar Daniel (IL)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 15/690,668

(22) Filed: Aug. 30, 2017

(65) Prior Publication Data
US 2019/0068620 A1    Feb. 28, 2019

(51) Int. Cl.
*H04L 29/06*    (2006.01)
*G06F 21/55*    (2013.01)

(52) U.S. Cl.
CPC ........ *H04L 63/1416* (2013.01); *G06F 21/554* (2013.01); *H04L 63/1441* (2013.01); *H04L 63/1433* (2013.01)

(58) Field of Classification Search
CPC ............. H04L 63/1416; H04L 63/1408; H04L 63/1441; H04L 63/1458
USPC ........................................... 726/23
See application file for complete search history.

(56) References Cited

U.S. PATENT DOCUMENTS

| | | | |
|---|---|---|---|
| 8,683,598 B1 | 3/2014 | Cashin | |
| 9,064,130 B1 | 6/2015 | Asheghian et al. | |
| 9,191,403 B2 | 11/2015 | Zoldi et al. | |
| 9,332,028 B2 | 5/2016 | Xaypanya et al. | |
| 2006/0174319 A1* | 8/2006 | Kraemer | G06F 21/53 726/1 |
| 2010/0251369 A1 | 9/2010 | Grant | |
| 2014/0201836 A1 | 7/2014 | Amsler | |
| 2014/0331320 A1* | 11/2014 | Satish | G06F 21/56 726/23 |

(Continued)

OTHER PUBLICATIONS

Physical Activity and IT Alert Correlation—LEV—pp. 1-39 (Year: 2017).*

(Continued)

*Primary Examiner* — Evans Desrosiers
(74) *Attorney, Agent, or Firm* — Kenneth Han (57) ABSTRACT

Detecting malware attacks is described herein. A computer-implemented method may include receiving, via a processor, events from a plurality of activity monitors. The method also include extracting, via the processor, a plurality of behavioral features from the received events. The method may further include detecting, via the processor, a malware attack based on the extracted behavioral features using a malware identification model trained on private data and public data. The method may also include executing, via the processor, an ad hoc protection improvement based on the detected malware attack.

20 Claims, 8 Drawing Sheets

(56) References Cited

U.S. PATENT DOCUMENTS

2015/0242633 A1  8/2015  Galil et al.
2015/0281259 A1  10/2015  Ranum et al.

OTHER PUBLICATIONS

Mell et al., "The NIST Definition of Cloud Computing," US. Department of Commerce, National Institute of Standards and Technology, Sep. 2011, p. 1-7, Special Publication 800-145.
Bluecoat, "Next Generation Security Analytics: Real World Use Cases", Whitepaper, Copyright 2014 by Blue Coat Systems, Inc., pp. 1-10.
Rao et al., "Security 360°: Enterprise security for the cognitive era", IBM J. Res. & Dev., vol. 60, No. 4, Paper 1, Jul./Aug. 2016, Copyright 2016 by International Business Machines Corporation, pp. 1-11.
Tripwire Enterprise, https://www.tripwire.com/products/tripwire-enterprise/, Copyright 1997-2017 by Tripwire, Inc., printed on Aug. 22, 2017, pp. 1-5.
Eclipse, http://www.eclipse.org/robots.txt, printed on Aug. 22, 2017, pp. 1-3.
Symantec, "Security Response", IT Security Threats, Symantec, https://www.symantec.com/security_response/writeup.jsp?docid=2010-011016-3514-99&tabid=2, printed on Aug. 29, 2017, pp. 1-2.
IBM, "IBM QRadar User Behavior Analytics", https://www.ibm.com/ms-en/marketplace/qradar-user-behavior-analytics, printed Aug. 23, 2017, pp. 1-4.

\* cited by examiner

DETECTING MALWARE ATTACKS USING EXTRACTED BEHAVIORAL FEATURES

BACKGROUND

The present techniques relate to detecting malware attacks. More specifically, the techniques relate to detecting malware attacks using extracted behavioral features.

SUMMARY

According to an embodiment described herein, a system can include processor to receive events from a plurality of activity monitors. The processor can also further extract a plurality of behavioral features from the received events. The processor can also detect a malware attack based on the extracted behavioral features using a malware identification model trained on private data and public data. The processor can further also execute an ad hoc protection improvement based on the detected malware attack.

According to another embodiment described herein, a method can include receiving, via a processor, events from a plurality of activity monitors. The method can further include extracting, via the processor, a plurality of behavioral features from the received events. The method can also further include detecting, via the processor, a malware attack based on the extracted behavioral features using a malware identification model trained on private data and public data. The method can also include executing, via the processor, an ad hoc protection improvement based on the detected malware attack.

According to another embodiment described herein, a computer program product for detecting malware attacks can include computer-readable storage medium having program code embodied therewith. The computer readable storage medium is not a transitory signal per se. The program code executable by a processor to cause the processor to receive events from a plurality of activity monitors. The program code can also cause the processor to extract a network behavioral feature, a database behavioral feature, a file behavioral feature, from the received events. The program code can also cause the processor to detect a malware attack based on the extracted behavioral features using a malware identification model trained on private data and public data. The program code can also cause the processor to execute an ad hoc protection improvement based on the detected malware attack.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

As the value of the data and digital assets increases, sensitive customer information, intellectual property and control of key equipment become more and more electronic and thus exposed to new threats. Every day new evasive, short term changing threats are observed. Owners of digital assets upgrade and increase the level of sophistication of defense systems in response to such changing threats.

Enterprises may typically have multiple systems to protect from sensitive data leakage. Each system may be an owner of one of multiple different phases of an enterprise data flow. For example, such phases may include database access monitoring (DAM), file access monitoring (FAM), and network access monitoring (NAM). Such systems may be separate and configured differently and may thus have different knowledge about the world. The activity on each system may not be reflected in the other systems. Therefore, there may be no overall view on how to protect from a combined attack that involves few phases of data leakage. For example, a FAM system may only be influenced by activity in the same machine or other machines with a FAM installed, but may not be aware of what happens in other parts of the enterprise resources. Thus, a FAM may not have the insight into activity which could have led to a data leakage by an authorized user or attacker. For example, if an attacker has access to a few machines and wants to extract sensitive data which he has access to, if the attacker extracts such information gradually and in small packets then the system may not be able to stop the attacker.

According to techniques described herein, a processor can track events from a plurality of activity monitors. For example, the activity monitors may include a FAM, DAM, NAM, or any combination thereof. The processor can then extract a network behavioral feature, a database behavioral feature, and a file behavioral feature from the received events. The processor can then detect a malware attack based on the extracted behavioral features using a malware identification model trained on private data and public data. The processor can then execute an ad hoc protection improvement based on the detected malware attack. Thus, the techniques described herein enable a wider range of malware attacks to be detected and responded to dynamically. Moreover, the techniques described herein enable detection of malware that was previously unknown based on a combination of behavioral features. The techniques may also be used to dynamically improve FAM, DAM, and NAM systems by continuously updating their knowledge bases, focus and spreading, using real time network monitoring system and analytics and adapting them to the big-data challenges. The techniques described herein may thus reduce sensitive data leakage and reduce the costs of administration of the different sensitive data monitoring systems.

In some scenarios, the techniques described herein may be implemented in a cloud computing environment. As discussed in more detail below in reference to at least FIGS. 5-7, a computing device configured to detect malware attacks using a behavioral feature model may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
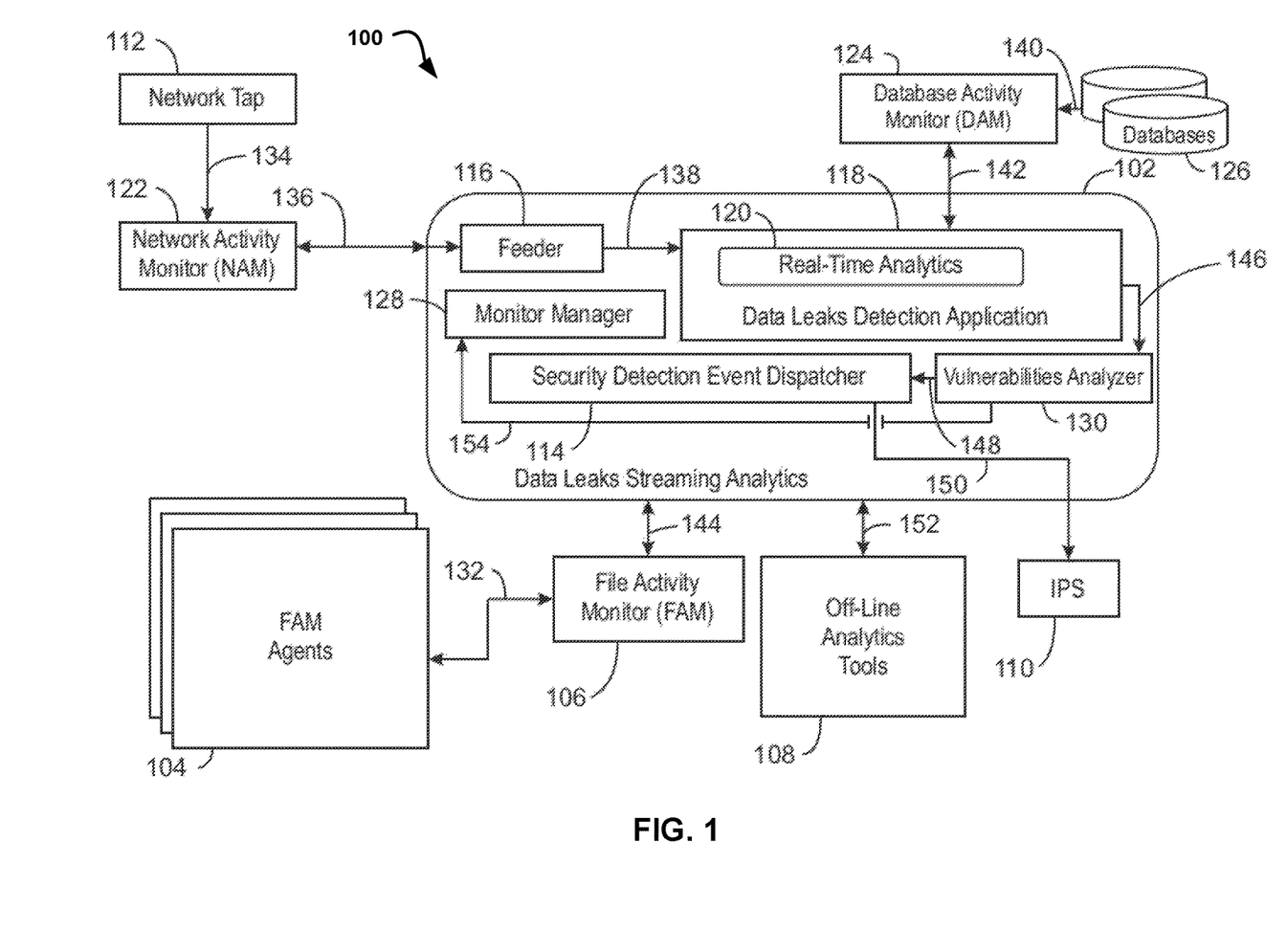
FIG. 1 is a block diagram of an example system for detecting malware attacks using extracted behavioral features.

With reference now to FIG. 1, a block diagram shows an example system for detecting malware attacks using extracted behavioral features. The example system is generally referred to by the reference number 100. FIG. 1 includes a data leaks streaming analytics apparatus 102 communicatively coupled to one or more FAM agents 104, a file activity monitor (FAM) 106, offline analytics tools 108, an intrusion prevention system (IPS) 110, a network tap 112. The Data Leaks Streaming Analytics apparatus 102 may further include a security detection event dispatcher 114, a feeder 116, and a data leaks detection application 118. The data leaks detection application 118 may further include a real-time analytics module 120. The system 100 may further include a network activity monitor (NAM) 122 communicatively coupled to the network tap 112 and the feeder 116, as shown by arrows 134 and 136, respectively. The feeder 116 may be communicatively coupled to the data leaks detection application 118, as shown by an arrow 138. The system 100 may further include a database activity monitor (DAM) 124 communicatively coupled to one or more databases 126, as shown by an arrow 140. The data leaks streaming analytics apparatus 102 may further include a monitor manager 128 communicatively coupled to the DAM 124, the FAM 106, and the NAM 122, as shown by arrows 142, 144 and 136, respectively. The data leaks streaming analytics apparatus 102 also may further include a vulnerabilities analyzer 130 communicatively coupled to the data leaks detection application 118 and the security detection event dispatcher 114, as shown by arrows 146 and 148, respectively. The security detection event dispatcher may also be communicatively coupled to the IPS as shown by an arrow 150. The off-line analytics tools may also be communicatively coupled to the data leaks streaming analytics 102 as shown by an arrow 152.

In the example of FIG. 1, the FAM agents 104 can identify sensitive data on a computing device. For example, a FAM agent 104 may be installed on each computing device that may handle sensitive data. In some examples, the FAM agents 104 can use a statistical engine to detect the sensitive data. For example, the FAM agents 104 may receive known sensitive data types from a trained knowledge base and a decision plan to identify sensitive data. The decision plan may be a set of rules used to identify sensitive data. For example, the rules may include threshold probabilities used to detect sensitive data based on sensitive data types. In addition, each FAM agent 104 can monitor access to the sensitive data according to a predefined policy. For example, the predefined policy may include content-related policies such policies for credit card numbers, or other specific values and patterns in files. In some examples, the predefined policy may include policies for file access patterns. For example, file access patterns can include file-related user activities and file-sharing activities.

Still referring to FIG. 1, the FAM 106 can manage and configure FAM agents 104. The FAM 106 may receive a list of content residing in each machine and the configuration of each FAM Agent 104 in each machine. The FAM 106 can update FAM knowledge bases and policies in each FAM agent 104. The FAM 106 can also install FAM agents 104 in machines detected as not having any installed FAM agent 104. For example, such machines may have not had any sensitive content previously stored or identified. The FAM 106 may thus install FAM agents 104 on such machines before any sensitive content is stored thereon. As shown by arrow 132, the FAM 106 can send and receive data to and from the FAM agents 104. For example, the data sent to the FAM agents 104 may include knowledge base updates, policy updates, decision plan updates, or configuration changes. The data received from the FAM agents 104 can include a list of sensitive data residing on each machine, configurations for each machine, among other data.

The FAM 106 can also send detected security events to the monitor manager 128 102 as indicated by an arrow 144. For example, the detected security events may be in a security detection event format (SDEF). As used herein, an SDEF may include access information, a classification of the sensitive data, and the rule identifying the data. The access information can include client IP, an event time, etc. In some examples, the actual sensitive data element may not be passed between the systems for security reasons. Instead, the data leaks application ID and parameters may be passed to the Data Leaks Streaming Analytics 102. For example, the parameters can be passed as regular expressions or as a reference to specific code shared by both systems. The detected security events may be received by the real-time analytics 120 and sent to the vulnerabilities analyzer 130 as indicated by an arrow 146. The monitor manager 128 can also receive detected security events from the FAM 106 as indicated by an arrow 144. For example, the detected security events may also be in a SDEF. The monitor manager 128 can thus manage communication between the data leaks streaming analytics apparatus 102 and the various monitors 106, 122, 124. The monitor manager 128 can receive parameters from the various monitors 106, 122, 124 in SDEF and pass those parameters to the Data Leaks Detection Application 118. In some examples, the monitor manager 128 can also manage the publication of parameters to various monitor subscribers, such as the NAM 122, the DAM 124, or the FAM 106. For example, in response to detecting a new attack, the Data Leaks Detection Application 118 can use the monitor manager 128 for re-configuration of the NAM 122, FAM 106 and DAM 124 for new attack detection enablement. In some examples, as shown by double sided arrows 136, 142, and 144, the various monitors can receive parameters that influence their dynamic detection of events. Thus, parameters may be communicated in both directions between the data leaks streaming analytics apparatus 102 and the NAM 122, DAM 124, and FAM 106.

The off-line analytics tools 108 may be initially and continuously fed by a history of data leakage as shown by arrow 152. For example, the history may include which kind of data was leaked by whom, how, and in what order. In some examples, the off-line analytics tools 108 can generate an analytics model for potential data leaks prevention based on historical data about known data leakage incidents based on a supervised model. In addition, the off-line analytics tools 108 can apply anomaly detection algorithms for potential leaks detection based on an unsupervised model.

The Intrusion Prevention System (IPS) 110 can proactively block transmitted data in a data stream based on triggers received from the security detection event dispatcher 114 as shown by arrow 150. In some examples, the IPS 110 may be a network appliance that is placed in-line in a network such that every packet that leaves the organizational network may pass through the IPS 110. For example, the IPS 110 may be an application level firewall. In some examples, the IPS 110 may include rules to examine each payload in the session and application layers of a packet (such as DNS, HTTP, SSL, and SMTP), as well as the sequence of those packets per those higher-layer protocols. In some examples, when traffic matches an IPS rule, the IPS 110 can either replace a specifically defined or suspicious byte sequence. In some examples, when traffic matches an IPS rule, the IPS 110 can completely drop packets or reset the network connection. The IPS 110 may thus be used to prevent sensitive information leakage.

The network tap 112 may be a protocol agnostic network component for a raw network traffic capture. For example, the network tap 112 may capture network traffic and send the network traffic to the NAM 122 as shown by arrow 134. The feeder 116 may thus receive and parse events from NAM 122. For example, the events may be in a security detection event format.

The real-time analytics component 120 may be a component running on a data leaks streaming analytics apparatus 102 102. The real-time analytics component 120 can detect data leaks in real-time. For example, the real-time analytics component 120 can apply an analytics model generated by the off-line analytics tools 108 in real-time.

As shown in FIG. 1, in response to a vulnerabilities analyzer 130 detecting suspicious activity in a sensitive file data, the vulnerabilities analyzer 130 can notify the security detection event dispatcher 114 that there was an attempt to access a given file and provide details of the incident. For example, the details may include user details, machine details, file metadata, and content details. For example, the content details may specify that the content is encrypted. The vulnerabilities analyzer 130 together with a protection improver module (not shown), can ad hoc detect the malware vulnerabilities utilized techniques in the IT system and determine actions to be taken. In some examples, the vulnerabilities analyzer 130 can cause a FAM agent 104 to track authorized but suspicious activity of sensitive files. For example, suspicious activity may include compressing or renaming of files. In some examples, the FAM agent 104 can notify the NAM 122 about the suspicious activity, so that the NAM 122 can cause the network tap 112 can track those files as well. The NAM 122 can then analyze the suspicious activity for network behavioral features and send the network behavioral features to the feeder 116 to send the network behavioral features to the data leaks detection application 118.

In some examples, the security detection event dispatcher 114 can generate rules dynamically in real-time to track and trigger blocking of sensitive content leakage. The security detection event dispatcher 114 can then send the rules to the IPS 110 as indicated by arrow 150 to update its rules for data leakage prevention. In addition, the detected security events may be used for analytics model updating and improvement. For example, analytics models of the off-line analytics tools 108, the real time analytics 120, or the FAM 106, the NAM 122, or the DAM 124 can be updated accordingly.

In response to the updated rules from the security detection event dispatcher 114, the IPS 110 can block the content from exiting the organization and notify the FAM 106. The FAM 106 can then change its policy regarding the user, the type of data, or the machine that the data is relevant to.

In some examples, events can be analyzed in real time in order to find a pattern or anomalies used for identifying an attack. For example, the real-time analytics 120 may be used to predict what an attacker may be trying to achieve and to dynamically modify the monitoring policy for a corresponding user, data, meta-data, or machines.

In some examples, the IPS 110 can trigger network traffic blocking of a user or from a machine based on rules generated by Data Leaks Detection Application 118 and sent to the IPS 110 through the Security Detection Event Dispatcher 114. For example, in response to the FAM 106 receiving a few security detection events from different FAM agents 104 that a user is trying to access sensitive data, the IPS can cause a network layer to prevent the user from sending encrypted content or can investigate deeper into what the user is sending.

In response to the NAM 122 recognizing a file or content that should not be sent, the NAM 122 can notify the FAM 106 about the file and provide details about the file. The FAM 106 can update the knowledge bases or decision plans of the FAM agents 104 with the data from that event, or may install a new FAM agent 104 in a machine whose files were not monitored until then. In some examples, the decision to install a FAM agent 104 on specific end-point machine can also be triggered by the NAM 122 in response to a high number of suspicious activities being detected by traffic analysis generated by an endpoint machine.

In some examples, the FAM 106, the NAM 122, and the DAM 124 can also use analytics tools in order to try to understand what kind of data, users, or machines are currently predicted as being under attack and send alerts to the FAM 106 the NAM 122, and the DAM 124, in order to track the data, users, or machines more carefully. In addition, the off-line analytics tools 108 can be used for real-time model improvement by historical data analysis. A new analytics model could be updated in the FAM 106, the NAM 122, and the DAM 124. For example, the NAM 122, DAM 124 and FAM 106 can run analytics models adopted to the data type collected by corresponding agents. For example, as NAM 122 copes with network data, the NAM 122 may run models for network traffic analytics. Similarly, the DAM 124 may run analytics models for database activity analytics, and the FAM 106 may run analytics models for file activity analytics. In addition, the Data Leaks Detection application 118 and Vulnerabilities Analyzer 130 can also runs their own models. For example, the Data Leaks Detection application model can be based on features combined from data received from NAM 122, DAM 124 and FAM 106. In some examples, the Vulnerabilities Analyzer 130 can ad hoc detect the malware vulnerabilities utilized by malware attached detected by 14 and determine actions to be taken to protect the organization.

In some examples, the FAM 106 can manage a pool of FAM agents 104 and decide in which machines to install the FAM agents 104 based on calculations of what data is residing in which machines, which data is more sensitive and most attacked, where data was sent from and blocked using the network component, and based on analytics of what data may be attacked next. For example, there may be only a limited number of licenses or other resource restrictions on the number of FAM agents 104. In some examples, the FAM 106 can determine the data that is being attacked more than other data based on data from existing FAM agents 104 and the NAM 122. For example, if the real-time analytics system 120 identifies that several FAM agents 104 were alerted about attempts of some users to access some sort of sensitive personal information (SPI) and several network components blocked another type of SPI from those users, then the vulnerabilities analyzer 130 can alert both FAM agents 104 and NAM 122 that those users should be tracked. The vulnerabilities analyzer 130 can then analyze patterns to predict the next data that the attackers may try to access and cause the monitor manager 128 to block the attackers in the FAM agents 104 or move FAM agents 104 into machines that contain the corresponding data, as shown by the arrow 154. For example, the vulnerabilities analyzer 130 can use specific attack details received from the real time analytics component 120 and its organizational network knowledge for vulnerabilities prediction in specific organizational network.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, or additional resource servers, etc.).

Figure 2:
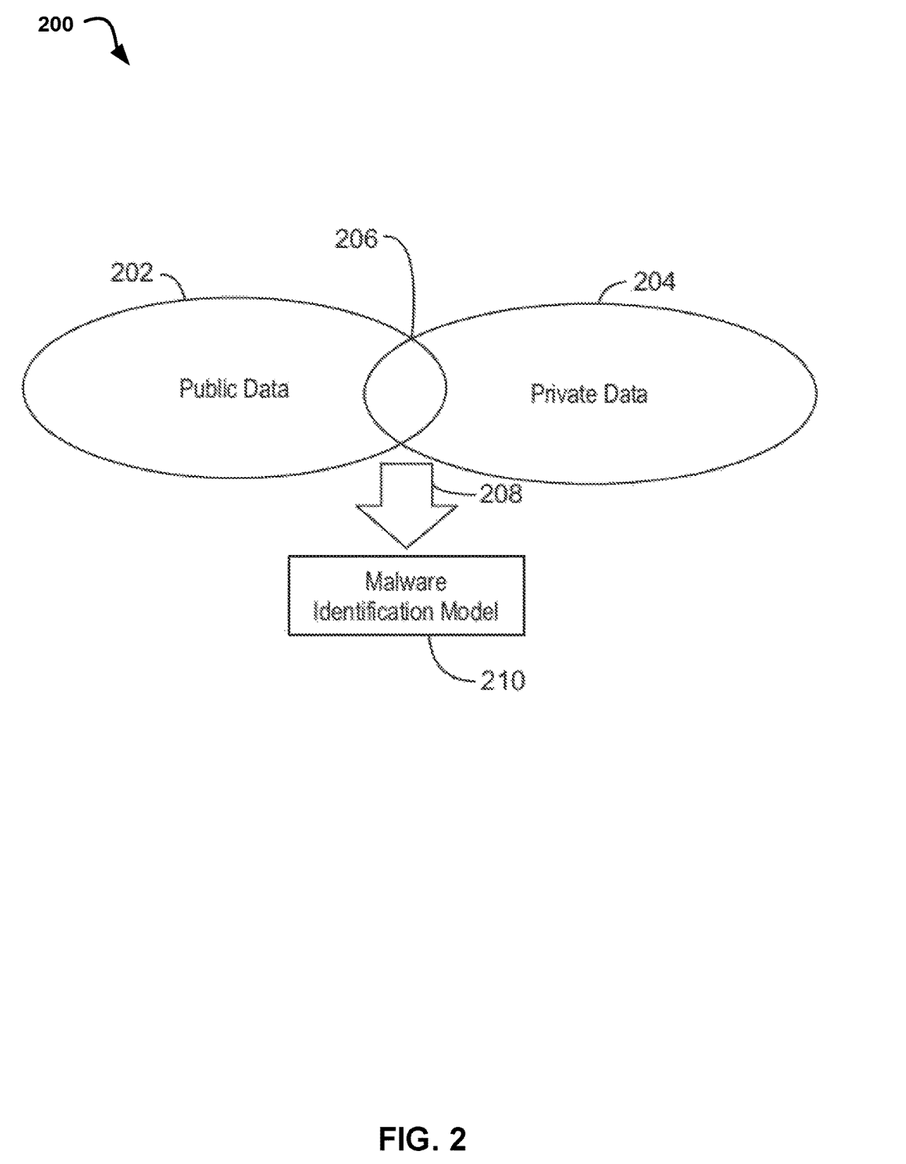
FIG. 2 is a block diagram of example data used to generate a malware detection model.

FIG. 2 is a block diagram of example system used to generate a malware detection model. The system is generally referred to using the reference number 200 and includes public data 202 and private data 204. An overlap 206 is shown between the public data 202 and the private data 204. A resulting malware identification model 210 may be trained based on the overlap 206 as indicated by an arrow 208. For example, the malware model 210 may be a supervised or an unsupervised learning model.

As shown in FIG. 2, a malware model can be trained using two sources of data. The public data 202 may include public malware analysis reports. The private data 204 may include enterprise attack findings. For example, the enterprise attack findings may include behavioral features associated with a detected malware aggregated from different system agents. As used herein, behavioral features refer to behavioral characteristics of a malware as detected by a monitoring system. In some examples, behavioral features may be derived from one or more behavioral characteristics. For example, single feature value might be combined from one or more behavioral characteristics. In some examples, the behavioral features may include network behavioral features detected by a NAM 122 from network data collected by a network tap 112. The behavioral features may also include database behavioral features collected by a DAM 124. The behavioral features may also include file behavioral features collected by a FAM 106.

For example, network behavioral features may include communication pattern characteristics. The communication pattern characteristics may include the type of communication the malware uses. Communication pattern characteristics may also include user IDs. For example, user IDs may include various IDs and characteristics the malware uses, such as user types, how many concurrent users are activated at the same type, how many different machines a user is authorized to access, etc. The communication pattern characteristics may also include the proxy agents that a malware uses. The communication pattern characteristics may also include data encryption characteristics. In some examples, network behavioral features may also include proxy agents used by a malware attack. For example, the proxy agent information can include machine MAC address to simplify physical machine detection and network traffic characteristics. In some examples, network behavioral features can include data characteristics such as encryption type, file size, file type, etc. In some examples, network behavioral features can include protocol errors. For example, protocol errors may include errors such as NXDomain (non-existent domain), SERVFAIL (Server Failure), and REFUSED (Query Refused). In some examples, network behavioral features can include access domain metadata. For example, the access domain metadata may include a list of protocols used for domain access in each period of time.

In some examples, the database behavioral features may include data pattern characteristics. For example, the data pattern characteristics may include a user account used by the malware to access data. In some examples, database behavioral features can include database servers. For example, the database servers can be identified using Internet Protocol (IP) address or media access control (MAC) address. In some examples, database behavioral features can include the content of the activities against the database server. For example, the content can include database users, queries, query frequency, and time and response content. In some examples, database behavioral features can include the amount of activities per given timeframe. For example, the amount of activities can be a number of activities per second, minute, hour, or any other suitable multiple or interval. In some examples, database behavioral features can include a database name and column name.

In some examples, the file behavioral features can include file metadata. For example, file metadata can include size, permissions, location, modification time, file modification frequency, file owner. In some examples, the file behavioral features can include file permissions. For example, file permissions can include read, write, and access permissions. In some examples, the file behavioral features can include user identifications. For example, user identifications may include user accounts used to access files. In some examples, the file behavioral features can include content classifications. For example, content classifications can include entity detection and entity-based file content categorization. In some examples, the file behavioral features can include file actions. For example, file actions can include any actions performed on one or more files, such as copy, read, write, etc.

As shown in FIG. 2, the system 200 may utilize publicly known malware analytic reports as well as the actual system findings collected from the system attacks to train a malware detection model 210. For example, the malware detection model may be based on the overlap 206 indicating malicious activity. Thus, various behavioral features 204 collected from system attacks may provide a wide view on the attacks behavioral characteristics. The malware identification model 210 may then be used by the system 200 to identify the type of attack that the system 200 may be currently coping with. In some examples, based on this identification, the system 200 can perform a sequence of ad hoc proactive steps that improves the system protection based on known techniques associated with the detected malware attack. For example, the system 200 can dynamically install the FAM agent 104 on machines correlated with the current detected malware attack.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional data sources, or models, etc.).

Figure 3:
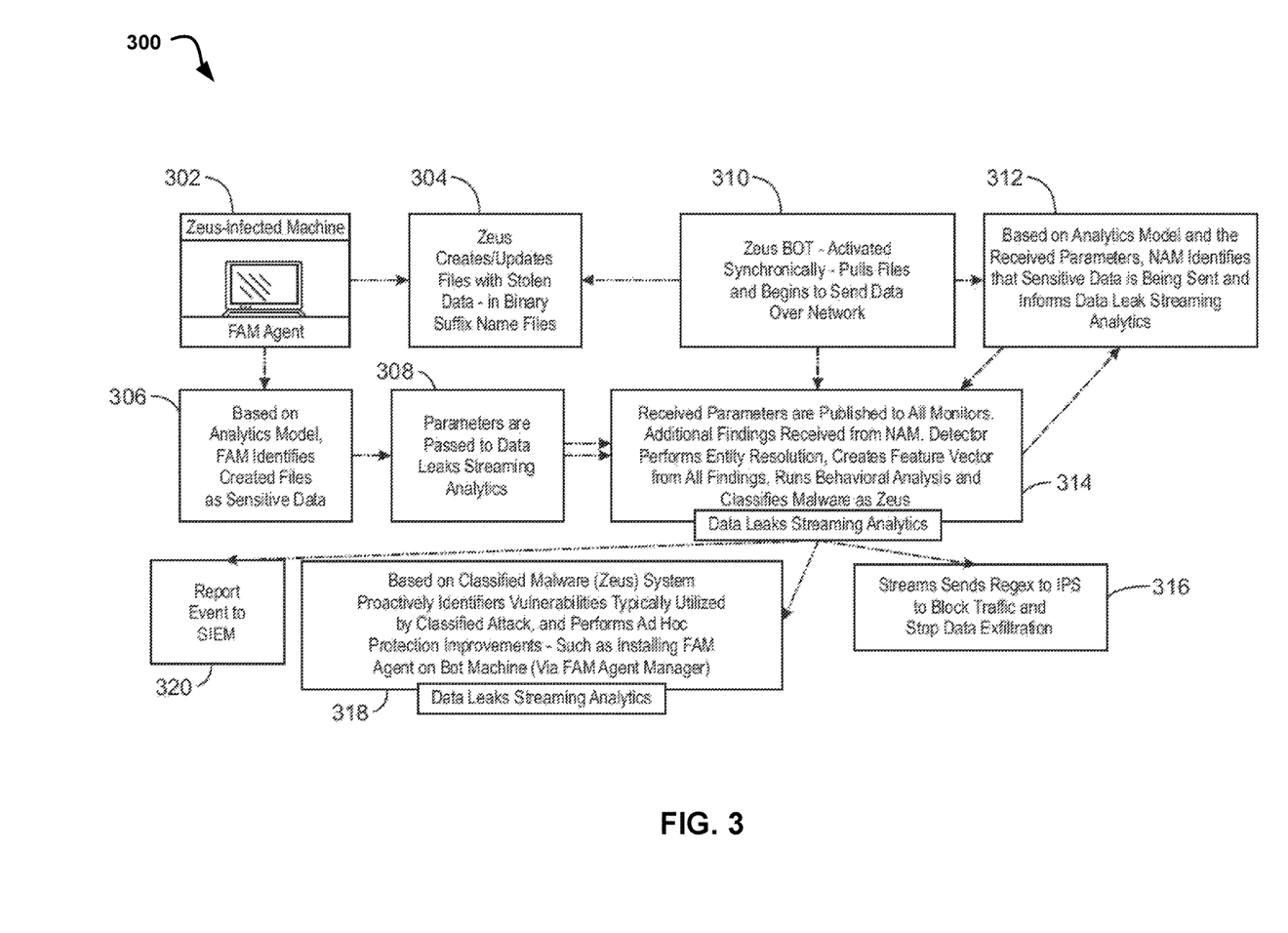
FIG. 3 is a block diagram of an example detection process for a Zeus malware infected machine.

FIG. 3 is a process flow diagram of an example detection of a Zeus malware infected machine. The process 300 can be implemented with any suitable computing device, such as the computing device 500 of FIG. 5 or the system 100 of FIG. 1. For example, the methods described below can be implemented by the data leaks detection application 118 or the processor 502 of computing device 500 of FIG. 5.

In the example of FIG. 3, the techniques described herein may be able to detect the Zeus malware based on several behavioral characteristics of the Zeus malware. The Zeus malware, also known as ZeuS, or Zbot, is a Trojan horse malware package that runs on some versions of Microsoft Windows®. While the Zeus malware can be used to carry out many malicious and criminal tasks, it is often used to steal banking information using man-in-the-browser keystroke logging and form grabbing. In particular, the Zeus malware can steal sensitive data and aggregate the sensitive data on a disk in files. A second file may be dropped into a "lowsec" folder, with one of the following file names: "audio.dll," "sysproc86.sys," or "local.ds." This file may then serve as a storage text file for any of the stolen information. Whenever a password is obtained by the malware, the password is saved in this file and later sent to the attacker. The Zeus malware also may use HTTP user-agent and proxy-agent fields on a victim machine for communication with a command and control (C&C) server.

As shown in FIG. 3, a machine 302 with a FAM agent installed may be infected with the Zeus malware. At block 304, the Zeus malware creates or updates files with stolen data in binary suffix name files. At block 306, based on a FAM analytics model, the FAM identifies the created files as sensitive data. For example, the FAM 106 may have an analytics model adapted to the type of data that the FAM analyzes. At block 308, one or more parameters are passed from the FAM 106 to a data leaks streaming analytics.

At block 310, the Zeus malware BOT is activated synchronically and pulls files and begins to send data over the network. At block 312, based on an analytics model and the received parameters, a NAM 122 identifies that sensitive data is being sent and informs the Data Leaks Streaming Analytics.

At block 314, the Data Leaks Streaming Analytics publishes received parameters to all monitors. The Data Leaks Streaming Analytics may also receive additional findings from the NAM. In addition, a detector performs entity resolution, creates feature vector from all findings, runs a behavioral analysis, and classifies the malware as Zeus.

At block 316, the Data Leaks Streaming Analytics sends a regular expression (regex) to the IPS to block traffic associated with the Zeus malware and stop data exfiltration.

At block 318, based on the malware being classified as the Zeus malware, the system proactively identifies vulnerabilities typically utilized by the Zeus malware. The system then executes ad hoc protection improvements. For example, the ad hoc protection improvements may include the FAM Agent Manager installing a FAM agent on the bot machine.

At block 320, the Data Leaks Streaming Analytics generates a report and sends the report to a security information and event management (SIEM) service. In some examples, the Data Leaks Streaming Analytics collects findings and uses the collected findings in retraining a malware identification model.

The process flow diagram of FIG. 3 is not intended to indicate that the operations of the process 300 are to be executed in any particular order, or that all of the operations of the process 300 are to be included in every case. Additionally, the process 300 can include any suitable number of additional operations.

Figure 4:
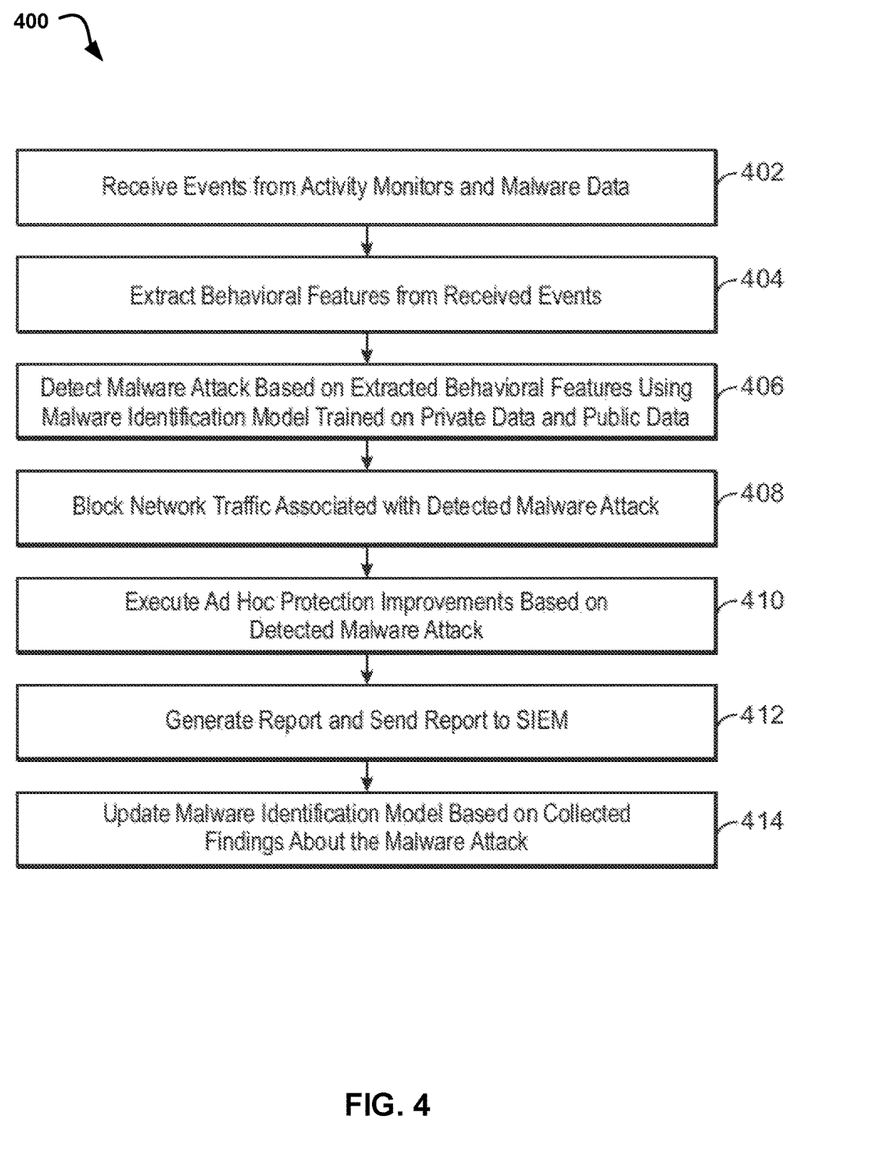
FIG. 4 is a block diagram of an example method that can detect malware attacks using extracted behavioral features.

FIG. 4 is a process flow diagram of an example method that can detect malware attacks using extracted behavioral features. The method 400 can be implemented with any suitable computing device, such as the computing device 500 of FIG. 5 and is described with reference to the system 100 of FIG. 1. For example, the methods described below can be implemented by the data leaks detection application 118 or the processor 502 of computing device 500 of FIG. 5.

At block 402, a processor receives events from activity monitors. For example, the processor may receive the events from a NAM, a DAM, and a FAM. In some examples, the events may be in a security detection event format (SDEF).

At block 404, the processor extracts behavioral features from the received events. For example, the behavioral features may include network behavioral features, database behavioral features, file behavioral features, or any combination thereof. In some examples, the network behavioral features may include communication pattern characteristics. The communication pattern characteristics may include the type of communication the malware uses, user IDs, the proxy agents that a malware uses, and data encryption characteristics. Database behavioral features may include data pattern characteristics corresponding to a database, such as a user account used by malware to access data. File behavioral features may include file metadata, a file permission, a user identification, a content classification, a file action, or any combination thereof. In some examples, the processor can run a model on a complex event combined from events coming from NAM 122, DAM 124 and FAM 104.

At block 406, the processor detects a malware attack based on the extracted behavioral features using the malware identification model trained on private data and public data. For example, the malware identification model may be a classification model trained using both public data and private enterprise attack findings, as described in FIG. 2 above. The public data may include public data and analysis of various types of known malware. In some examples, a variety of machine or deep learning techniques may be used to detect the malware attack. For example, classification techniques may be used as well as neural networks. In some examples, the malware may be a previously unknown form of malware detected based on a combination of behavioral features. In some examples, the malware may be a known malware, such as the Zeus malware.

At block 408, the processor blocks network traffic associated with the detected malware attack. For example, the network traffic may include files being copied or transferred by the malware attack.

At block 410, the processor executes an ad hoc protection improvement based on the detected malware attack. For example, the processor can dynamically install a file access monitor agent on a machine correlated with the detected malware attack. In some examples, ad hoc protection improvements can include blocking access to the tables with sensitive information for suspicious users, installation of security patches on machines, and blocking suspicious command and control domains.

At block 412, the processor generates a report and sends the report to a security information and event management (SIEM) service. For example, the report can include information with detected attack details including vulnerabilities detected by a vulnerabilities analyzer and recommended actions to take, or actions already automatically taken, for enterprise network defense.

At block 414, the processor can also update the malware identification model based on collected findings about the malware attack. For example, the processor can retrain the malware identification model based on collected findings associated with the malware attack. In some examples, the processor can further update a knowledge database based on the detected malware attack. For example, the collected findings can be added to the knowledge database to be used for training the malware identification model.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
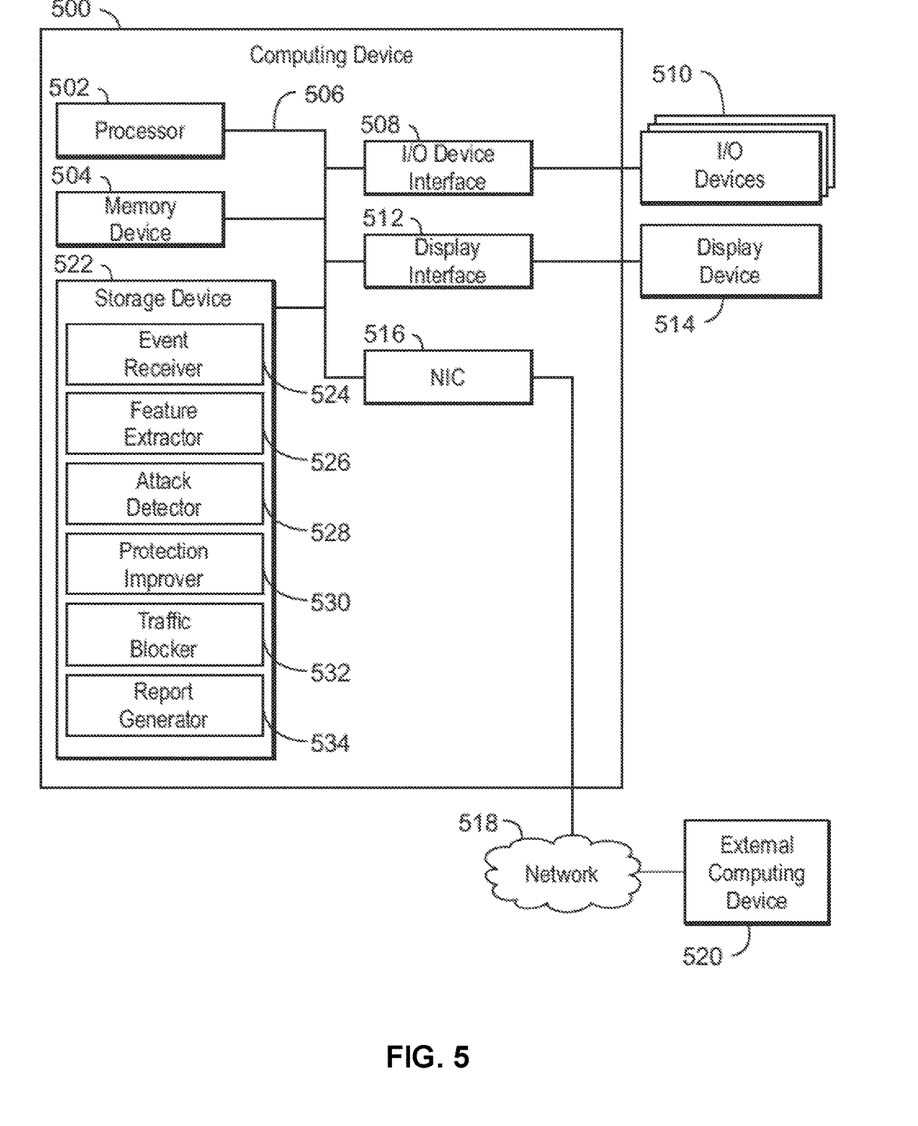
FIG. 5 is a block diagram of an example computing device that can detect malware attacks using extracted behavioral features.

FIG. 5 is block diagram of an example computing device that can detect malware attacks using extracted behavioral features. The computing device 500 may be for example, a server, desktop computer, laptop computer, tablet computer, or smartphone. In some examples, computing device 500 may be a cloud computing node. Computing device 500 may be described in the general context of computer system executable instructions, such as program modules, being executed by a computer system. Generally, program modules may include routines, programs, objects, components, logic, data structures, and so on that perform particular tasks or implement particular abstract data types. Computing device 500 may be practiced in distributed cloud computing environments where tasks are performed by remote processing devices that are linked through a communications network. In a distributed cloud computing environment, program modules may be located in both local and remote computer system storage media including memory storage devices.

The computing device 500 may include a processor 502 that is to execute stored instructions, a memory device 504 to provide temporary memory space for operations of said instructions during operation. The processor can be a single-core processor, multi-core processor, computing cluster, or any number of other configurations. The memory 504 can include random access memory (RAM), read only memory, flash memory, or any other suitable memory systems.

The processor 502 may be connected through a system interconnect 506 (e.g., PCI®, PCI-Express®, etc.) to an input/output (I/O) device interface 508 adapted to connect the computing device 500 to one or more I/O devices 510. The I/O devices 510 may include, for example, a keyboard and a pointing device, wherein the pointing device may include a touchpad or a touchscreen, among others. The I/O devices 510 may be built-in components of the computing device 500, or may be devices that are externally connected to the computing device 500.

The processor 502 may also be linked through the system interconnect 506 to a display interface 512 adapted to connect the computing device 500 to a display device 514. The display device 514 may include a display screen that is a built-in component of the computing device 500. The display device 514 may also include a computer monitor, television, or projector, among others, that is externally connected to the computing device 500. In addition, a network interface controller (NIC) 516 may be adapted to connect the computing device 500 through the system interconnect 506 to the network 518. In some embodiments, the NIC 516 can transmit data using any suitable interface or protocol, such as the internet small computer system interface, among others. The network 518 may be a cellular network, a radio network, a wide area network (WAN), a local area network (LAN), or the Internet, among others. An external computing device 520 may connect to the computing device 500 through the network 518. In some examples, external computing device 120 may be an external webserver 120. In some examples, external computing device 120 may be a cloud computing node.

The processor 502 may also be linked through the system interconnect 506 to a storage device 522 that can include a hard drive, an optical drive, a USB flash drive, an array of drives, or any combinations thereof. In some examples, the storage device may include an event receiver 524, a feature extractor 526, an attack detector 528, a protection improver 530, a traffic blocker 532, and a report generator 534. The event receiver 524 can receive events from a plurality of activity monitors. For example, the feature receiver 524 can receive the events from a NAM, a DAM, and a FAM. The feature extractor 526 can extract a plurality of behavioral features from the received events. For example, the extracted behavioral features can include network behavioral features, database behavioral features, and file behavioral features. In some examples, the network behavioral feature comprises a user identification, a proxy agent used by the malware attack, a data characteristic, a protocol error, an access domain metadata, or any combination thereof. In some examples, the database behavioral feature comprises a user account used by the malware to access data. In some examples, the file behavioral feature can include file metadata, file permissions, user identifications, content classification, file actions, including copy, read, and write, or any combination thereof. The attack detector 528 can detect a malware attack based on the extracted behavioral features using a malware identification model trained on private data and public data. The protection improver 530 can execute an ad hoc protection improvement based on the detected malware attack. For example, the protection improver 530 can execute a dynamic installation of a file access monitor agent on a machine correlated with the detected malware attack. In some examples, the traffic blocker 532 can block network traffic associated with the detected malware attack. The report generator 534 can generate a report and send the report to a security information and event management (SIEM) service.

It is to be understood that the block diagram of FIG. 5 is not intended to indicate that the computing device 500 is to include all of the components shown in FIG. 5. Rather, the computing device 500 can include fewer or additional components not illustrated in FIG. 5 (e.g., additional memory components, embedded controllers, modules, additional network interfaces, etc.). Furthermore, any of the functionalities of the feature receiver 524, the model generator 526, and the attack detector 528, the protection improver 530, traffic blocker 532, or the report generator 534, may be partially, or entirely, implemented in hardware and/or in the processor 502. For example, the functionality may be implemented with an application specific integrated circuit, logic implemented in an embedded controller, or in logic implemented in the processor 502, among others. In some embodiments, the functionalities of the feature receiver 524, the model generator 526, and the attack detector 528, the protection improver 530, traffic blocker 532, and the report generator 534, can be implemented with logic, wherein the logic, as referred to herein, can include any suitable hardware (e.g., a processor, among others), software (e.g., an application, among others), firmware, or any suitable combination of hardware, software, and firmware.

Figure 6:
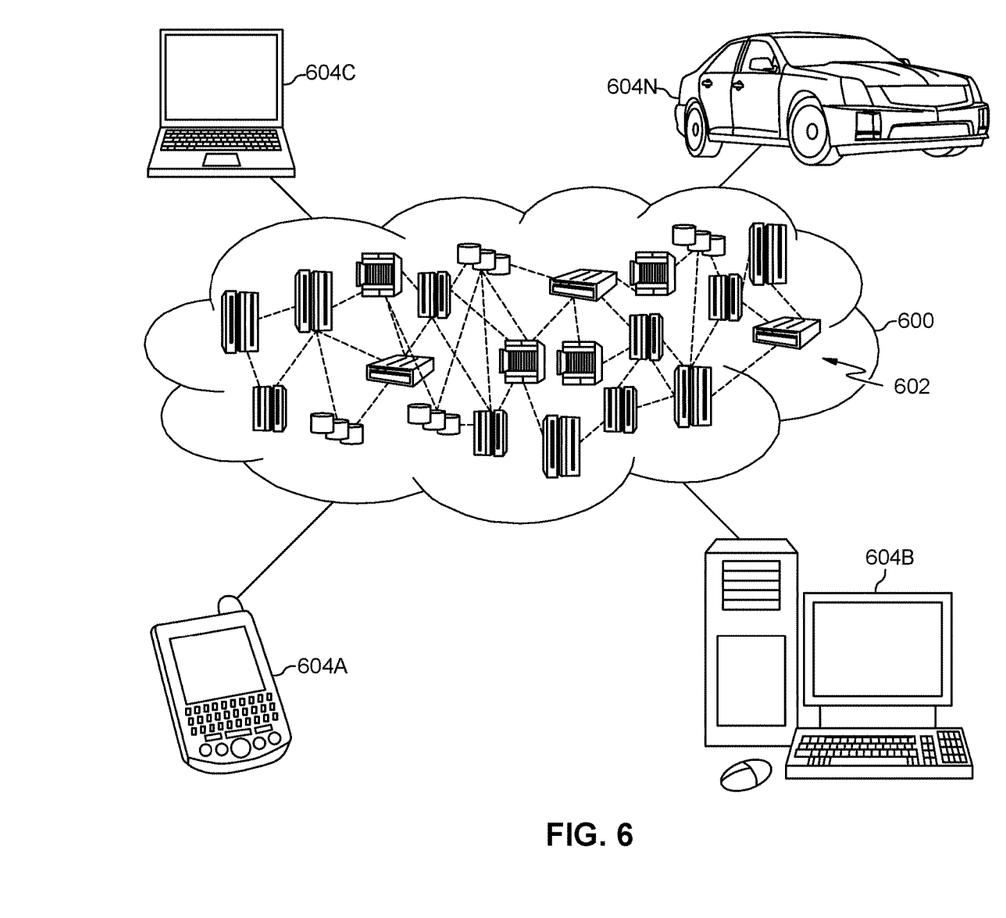
FIG. 6 is a process flow diagram of an example cloud computing environment according to embodiments described herein.

Referring now to FIG. 6, illustrative cloud computing environment 600 is depicted. As shown, cloud computing environment 600 comprises one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
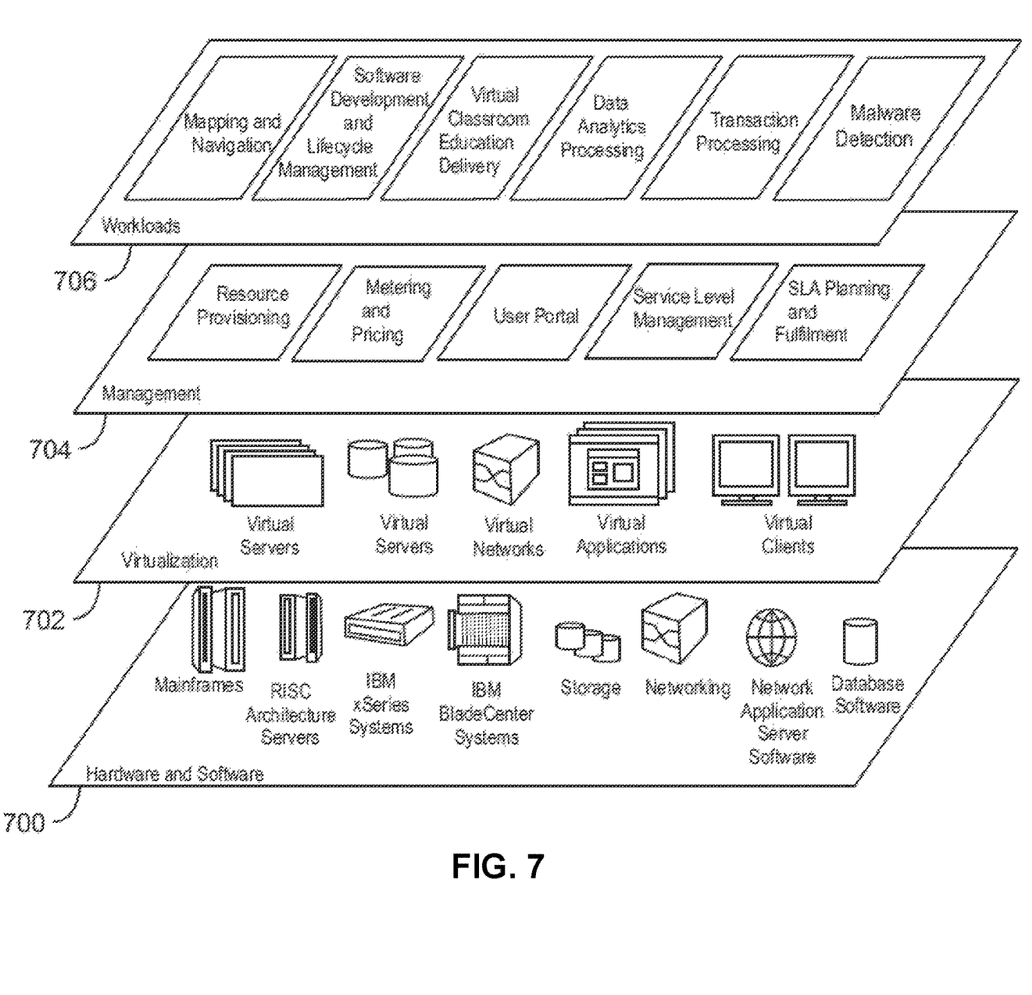
FIG. 7 is a process flow diagram of an example abstraction model layers according to embodiments described herein.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided.

Hardware and software layer 700 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 702 provides an abstraction layer from which the following examples of virtual entities may be provided: virtual servers; virtual storage; virtual networks, including virtual private networks; virtual applications and operating systems; and virtual clients. In one example, management layer 704 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 706 provides examples of functionality for which the cloud computing environment may be utilized. Examples of workloads and functions which may be provided from this layer include: mapping and navigation; software development and lifecycle management; virtual classroom education delivery; data analytics processing; transaction processing; and malware detection and response.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
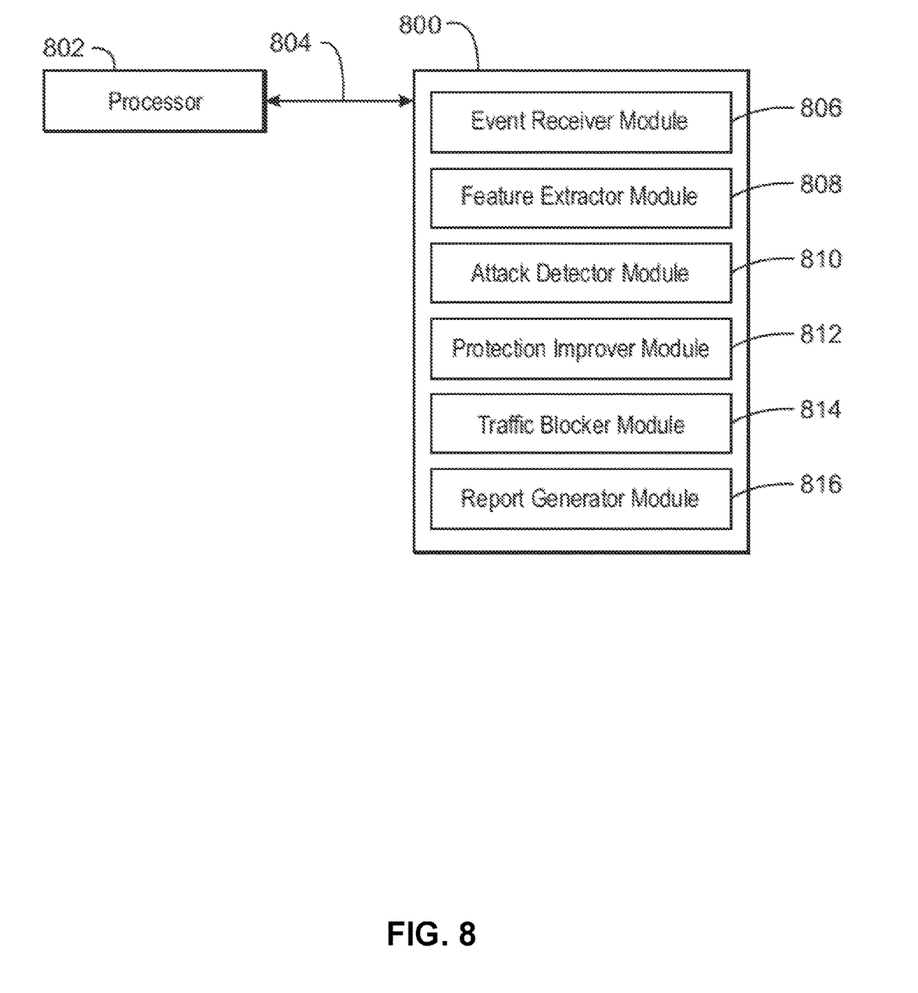
FIG. 8 is an example tangible, non-transitory computer-readable medium that can detect malware attacks using extracted behavioral features.

Referring now to FIG. 8, a block diagram is depicted of an example tangible, non-transitory computer-readable medium 800 that can detect malware attacks using extracted behavioral features. The tangible, non-transitory, computer-readable medium 800 may be accessed by a processor 802 over a computer interconnect 804. Furthermore, the tangible, non-transitory, computer-readable medium 800 may include code to direct the processor 802 to perform the operations of the method 400 of FIG. 4 above.

The various software components discussed herein may be stored on the tangible, non-transitory, computer-readable medium 800, as indicated in FIG. 8. For example, an event receiver 806 includes code to receive events from activity monitors. For example, the event receiver module 806 may include code to receive events from a FAM, NAM, DAM, or any combination thereof. A feature extractor module 808 includes code to extract behavioral features from the received events. For example, the behavioral features can include network behavioral features, database behavioral features, file behavioral features, or any combination thereof. An attack detector module 810 includes code to detect a malware attack based on the extracted behavioral features using a malware identification model trained on private data and public data. A protection improver module 812 includes code to execute an ad hoc protection improvement based on the detected malware attack. For example, the protection improver module 812 may include code to dynamically install a file access monitor agent on a machine correlated with the detected malware attack. In some examples, the protection improver module 812 can retrain the malware identification model based on collected findings associated with the malware attack. A traffic blocker module 814 includes code to block network traffic associated with the detected malware attack. A report generator module 816 includes code to generate a report and sending the report to a security information and event management (SIEM) service. In some examples, the report generator module 816 may include code to update a knowledge database based on the detected malware attack. It is to be understood that any number of additional software components not shown in FIG. 8 may be included within the tangible, non-transitory, computer-readable medium 800, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving events from a plurality of activity monitors;
extracting a plurality of behavioral features from the received events, wherein the behavioral features include network behavioral features, database behavioral features, and file behavioral features;
detecting a malware attack based on the extracted behavioral features using a malware identification model trained on private data and public data, wherein the malware includes previously unknown form of malware detected based on a combination of the behavioral features; and
executing an ad hoc protection improvement based on the detected malware attack, wherein the improvement includes dynamically installing a file access monitor agent on a machine correlated with the detected malware attack, blocking access to tables with sensitive information for suspicious users, installation of security patches on machines, and blocking suspicious command and control domains.

2. The computer system of claim 1, wherein the ad hoc protection improvement comprises a dynamic installation of a file access monitor agent on a machine correlated with the detected malware attack.

3. The computer system of claim 1, wherein the processor is to block network traffic associated with the detected malware attack.

4. The computer system of claim 1, wherein the network behavioral feature comprises a user identification, a proxy agent used by the malware attack, a data characteristic, a protocol error, an access domain metadata, or any combination thereof.

5. The computer system of claim 1, wherein the database behavioral feature comprises a user account used by the malware attack to access data.

6. The computer system of claim 1, wherein the file behavioral feature comprises a file metadata, a file permission, a user identification, a content classification, a file action, or any combination thereof.

7. The computer system of claim 1, wherein the plurality of activity monitors comprise a file activity monitor, a network activity monitors, a database activity monitor, or any combination thereof.

8. A computer-implemented method, comprising:
receiving, via a processor, events from a plurality of activity monitors;
extracting, via the processor, a plurality of behavioral features from the received events, wherein the behavioral features include network behavioral features, database behavioral features, and file behavioral features;

detecting, via the processor, a malware attack based on the extracted behavioral features using a malware identification model trained on private data and public data, wherein the malware includes previously unknown form of malware detected based on a combination of the behavioral features; and executing, via the processor, an ad hoc protection improvement based on the detected malware attack, wherein the improvement includes dynamically installing a file access monitor agent on a machine correlated with the detected malware attack, blocking access to tables with sensitive information for suspicious users, installation of security patches on machines, and blocking suspicious command and control domains.

9. The method of claim 8, wherein the ad hoc protection improvement comprises dynamically installing a file access monitor agent on a machine correlated with the detected malware attack.

10. The method of claim 8, comprising blocking, via the processor, network traffic associated with the detected malware attack.

11. The method of claim 8, comprising generating a report and sending the report to a security information and event management (SIEM) service.

12. The method of claim 8, comprising updating the malware identification model based on collected findings about the malware attack.

13. The method of claim 8, comprising updating a knowledge database based on the detected malware attack.

14. The method of claim 8, further comprising retraining the malware identification model based on collected findings associated with the malware attack.

15. A computer program product for detecting malware attacks, the computer program product comprising:

one or more computer-readable tangible storage medium and program instructions stored on at least one of the one or more tangible storage medium, the program instructions executable by a processor capable of performing a method, the method comprising:

receiving events from a plurality of activity monitors;

extracting a plurality of behavioral features from the received events, wherein the behavioral features include network behavioral features, database behavioral features, and file behavioral features;

detecting a malware attack based on the extracted behavioral features using a malware identification model trained on private data and public data, wherein the malware includes previously unknown form of malware detected based on a combination of the behavioral features; and executing an ad hoc protection improvement based on the detected malware attack, wherein the improvement includes dynamically installing a file access monitor agent on a machine correlated with the detected malware attack, blocking access to tables with sensitive information for suspicious users, installation of security patches on machines, and blocking suspicious command and control domains.

16. The computer program product of claim 15, further comprising program code executable by the processor to dynamically install a file access monitor agent on a machine correlated with the detected malware attack.

17. The computer program product of claim 15, further comprising program code executable by the processor to block network traffic associated with the detected malware attack.

18. The computer program product of claim 15, further comprising program code executable by the processor to generate a report and sending the report to a security information and event management (SIEM) service.

19. The computer program product of claim 15, further comprising program code executable by the processor to update a knowledge database based on the detected malware attack.

20. The computer program product of claim 15, further comprising program code executable by the processor to retrain the malware identification model based on collected findings associated with the malware attack.

* * * * *